(12) United States Patent  
Waynick, Sr.

(10) Patent No.: US 8,212,164 B2
(45) Date of Patent: Jul. 3, 2012

(54) OUTSIDE THE DOOR RACKING AND INTERLOCK

(75) Inventor: Rodger Dale Waynick, Sr., Murfreesboro, TN (US)

(73) Assignee: Schneider Electric USA, Inc., Palatine, IL (US)

( * ) Notice: Subject to any disclaimer, the term of this patent is extended or adjusted under 35 U.S.C. 154(b) by 310 days.

(21) Appl. No.: 12/715,470

(22) Filed: Mar. 2, 2010

(65) Prior Publication Data

US 2011/0214968 A1   Sep. 8, 2011

(51) Int. Cl.
*H01H 9/00* (2006.01)
(52) U.S. Cl. .................................. 200/50.24
(58) Field of Classification Search ........... 200/50.26, 200/50.24, 50.21, 50.17, 50.13, 50.19
See application file for complete search history.

(56) References Cited

U.S. PATENT DOCUMENTS

| | | |
|---|---|---|
| 2,554,510 A | 5/1951 | Spicer |
| 5,477,017 A | 12/1995 | Swindler et al. |
| 6,777,627 B1 | 8/2004 | Stevenson |

OTHER PUBLICATIONS

ABB Brochure, Air Insulated Switchgear for Secondary Distribution; (4 pages); dated Feb. 2009.
Powell Industries, Modification of PowlVac Switchgear for Through-Door Circuit Breaker Racking; (14 pages); dated (1999).

*Primary Examiner* — Briggitte R Hammond
(74) *Attorney, Agent, or Firm* — Nixon Peabody LLP

(57) ABSTRACT

An assembly that prevents a circuit breaker from being racked into and out of a switchgear compartment unless the compartment door is closed completely. A coupling member protrudes through the door and has an exposed hexagonal-shaped end to receive a socket of a racking tool. When the door is closed, a recess of the coupling member receives a drive shaft that has a drive pin through it. The drive pin slides into a slot formed in the recess of the coupling member such that when the racking tool cranks the coupling member, the coupling member in turn cranks the drive shaft as the drive pin engages the slot in the coupling member. However, when the door is open, the coupling member is separated from the drive pin so rotating the coupling member does not turn the drive shaft. An optional padlock and deadbolt assembly provides added security against unauthorized access to the tool-receiving end of the coupling member.

21 Claims, 6 Drawing Sheets

OUTSIDE THE DOOR RACKING AND INTERLOCK

FIELD OF THE INVENTION

The present disclosure relates generally to systems for racking circuit breakers in and out of electrical switchgear, and, more particularly, to an assembly that prevents racking of a circuit breaker into and out of switchgear when a compartment door of the switchgear is ajar.

BACKGROUND

According to the National Fire Protection Association (NFPA), an arc flash hazard is "a dangerous condition associated with the release of energy caused by an electric arc." An arc flash is an explosion causing severe burns, injuries and/or death depending on the severity. Arc flash incidents typically occur in applications above 120V and can take place when an electrical service is being inspected or serviced. In fact, some incidents occur when a worker is removing a cover or trim from a piece of equipment.

An arc flash can be caused by a reduction of the insulation or isolation distance between energized components such as when a tool is inserted or dropped into a breaker or service area, or when another conducting element is accidentally left behind that can compromise the distance between energized components. Often, incidents occur when an operator mistakenly fails to insure that the equipment has been properly de-energized.

Electrical switchgear equipment (sometimes just called switchgear or a switchboard) house circuit breakers that protect loads that can consume hundreds or thousands of amps of current. The procedure for making or breaking the electrical connections inside the switchgear between the circuit breaker and connectors in the switchgear is referred to as racking. Racking such circuit breakers is a procedure potentially wrought with personal danger to the operator's safety. A possibility always exists that an explosion will occur due to an arc flash, causing significant injury, including burns, or even death to the operator. One way to carry out a racking operation involves mounting the circuit breaker to rails in the switchgear, and sliding the circuit breaker into and out of a cradle of the switchgear. A hand or motorized crank (also called a racking tool) is typically used to urge primary connectors of the circuit breaker to corresponding connectors in the switchgear, which are electrically coupled to the line supply.

To perform the racking operation, the operator inserts the racking tool into a corresponding drive shaft that is accessible from outside the door of the compartment of the switchgear. However, it can be possible for this racking operation to be performed when the door is open. The door is designed to help withstand the explosive effects of an internal arc fault hazard, but when the door is open, the operator is fully exposed to the hazard. A racking operation should not be permitted when the door of the switchgear compartment is open to prevent this dangerous operation.

BRIEF SUMMARY

An assembly that allows a racking operation only from outside of a door of a switchgear compartment and prevents such operation when the door is ajar. Protruding through the compartment door is a coupling member that has an exposed end shaped to receive a correspondingly shaped socket of a racking tool. The racking tool is inserted into the exposed end and cranked manually or automatically by motor operation. A drive shaft inside the compartment has a drive pin passing through an end of the drive shaft. When the compartment door is completely closed, the drive pin slides into a corresponding slot cut into an end of the coupling member, engaging the drive pin with the coupling member. As the coupling member is rotated by the racking tool, the drive pin along with the drive shaft is rotated, causing the circuit breaker mechanically coupled to the drive shaft to be racked into or out of the switchgear. But when the door is open, the drive pin does not engage with the coupling member, so rotating the coupling member has no effect on the drive shaft. The end of the drive shaft can have a tapered profile that will not allow the racking tool to engage and turn the drive shaft, so any attempt by the operator to circumvent this safety feature will be thwarted. The door must be closed for the racking tool to crank the drive shaft.

An optional feature for the assembly includes a housing made of sheet metal that covers the end of the coupling member that protrudes through the door. A padlock can be secured to corresponding fixed and movable hasps, which are positioned to prevent insertion of a racking tool into the exposed end of the protruding coupling member. Removal of the padlock allows the movable hasp to be slid out of the way to expose the coupling member and permit insertion of the racking tool into the exposed end. Another feature includes a deadbolt locking mechanism that causes a deadbolt to impede access to the exposed end of the coupling member. When this optional deadbolt feature is also included, the operator must turn a key to withdraw the deadbolt and remove the padlock and slide the movable hasp out of the way to gain access to the coupling member.

Any one or combination of the foregoing desired and optional features ensure that only authorized personnel perform the racking operation and that the operation is capable of being carried out only when the door to the compartment is closed. The door remains hermetically sealed when closed, meaning that there are no exposed holes or openings through the door through which arc gasses or debris can escape during an arc flash event.

The foregoing and additional aspects and implementations of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
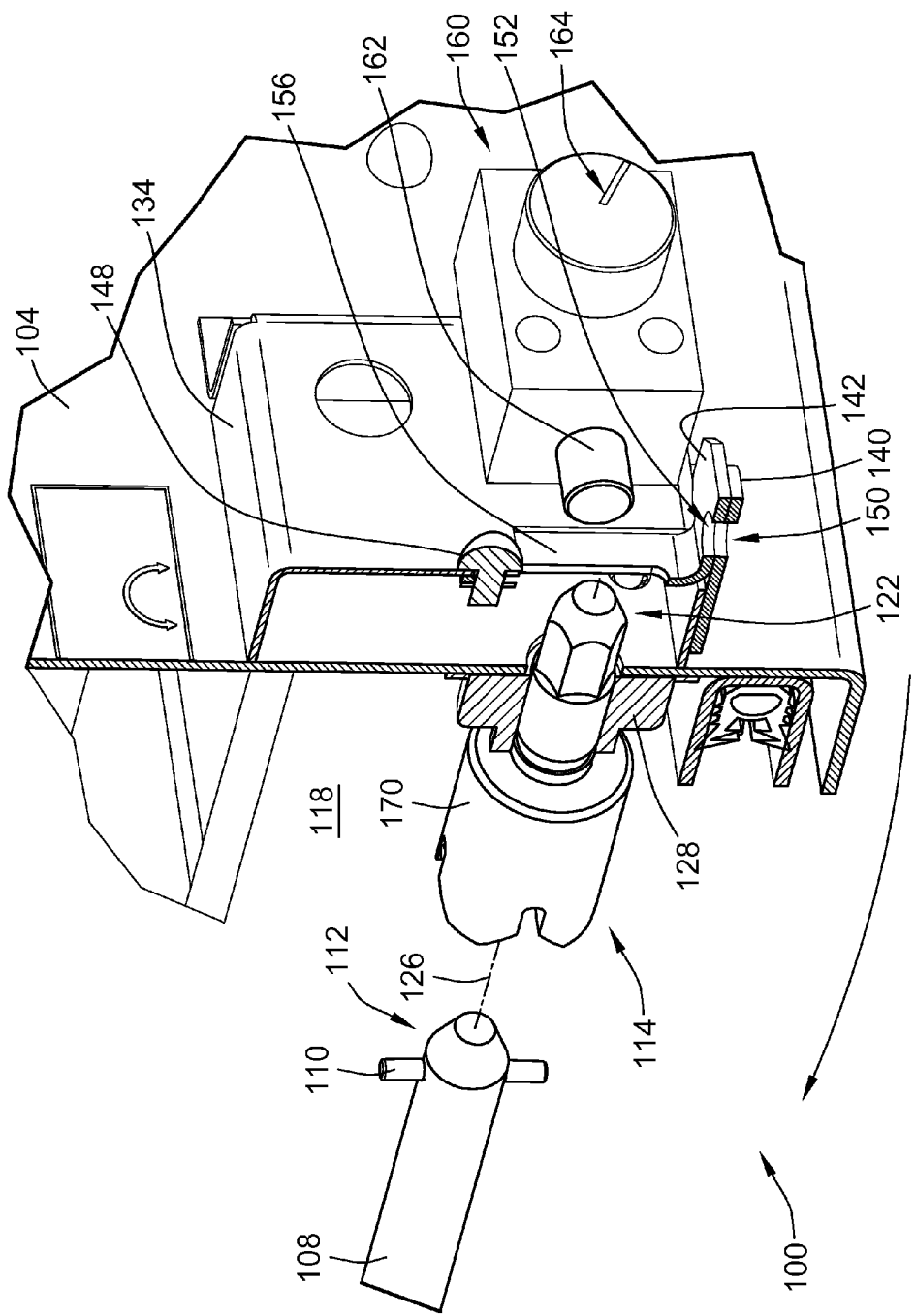
FIG. 1 is a cut-away isometric view of an assembly with a coupling member installed onto a door of a compartment.

While the present disclosure is susceptible to various modifications and alternative forms, specific embodiments have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the invention as defined by the appended claims.

DETAILED DESCRIPTION

As is known, a racking operation causes a circuit breaker in a switchgear to be placed in one of several positions: a remove position, a connected position, and optionally a test position. In the remove position, primary connectors of the circuit breaker are disconnected from corresponding connectors inside the switchgear, which are in turn connected to conductors that carry electrical current to the switchgear. In the connected position, the primary connectors are connected to corresponding connectors in the switchgear, allowing electrical current to flow through the circuit breaker when the circuit breaker is closed. In the optional test position, the primary connectors are disconnected from corresponding connectors in the switchgear, and optional secondary connectors are connected to corresponding secondary connectors in the switchgear to permit testing of the circuit breaker.

Referring now to FIG. 1, an assembly 100 is shown for preventing a racking operation on a circuit breaker (not shown) in a switchgear 102 (FIG. 2) while a door 104 of the compartment 106 is open. The assembly includes a racking drive shaft 108 and a drive pin 110 inserted into an end 112 of the racking drive shaft 108, which is near the door 104 of the compartment 106 when the door 104 is closed. The end 112 of the racking drive shaft 118 can be tapered as shown in FIG. 1, and the drive pin 110 can be inserted where the tapered part ends. The racking drive shaft 108 is positioned completely within an interior 118 of the compartment 106 that conventionally houses a circuit breaker (not shown). The racking drive shaft 108 is operable when rotated to rack the circuit breaker into or out of the compartment 106 of the switchgear 102. The assembly 100 further includes a coupling member 114 coupled to an interior surface 116 (FIG. 3) of the door 104. The interior surface 116 faces the interior 118 of the compartment 106. The coupling member 114 includes a drive pin engaging member 120 (FIGS. 6-8) that engages the drive pin 110 when the door 104 is closed to permit rotation of the racking drive shaft 108 by a racking tool or crank 180 (FIG. 4) that can be manually operated by an operator or automatically operated under control of a motor. The coupling member 114 further includes a racking tool receiving end or member 122, which protrudes through the door 104 (FIGS. 1 and 4), a drive pin receiving end 124, and a recess 126 in the drive pin receiving end 124. The coupling member 114 rotates about an axis 126 (FIG. 1) extending along a length of the coupling member 114.

Figure 6:
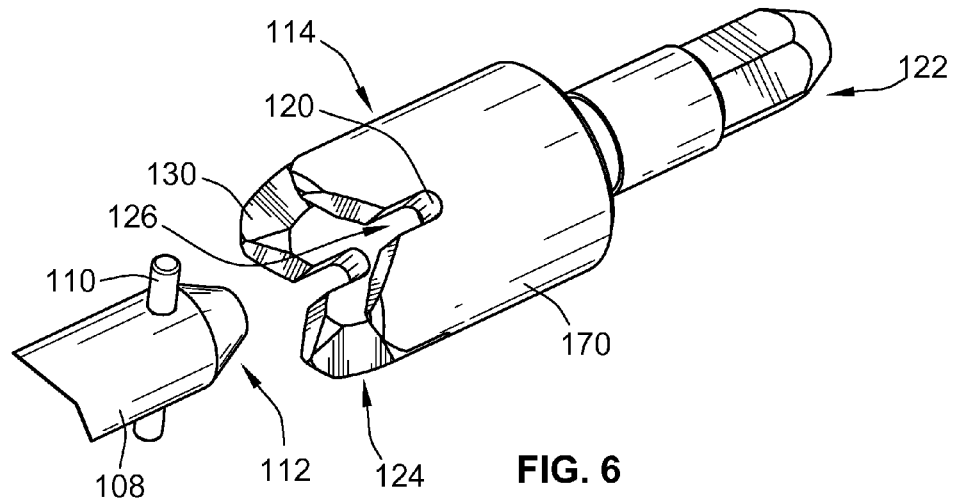
FIG. 6 is an isometric view of the drive shaft almost inserted into the coupling member.
Figure 7:
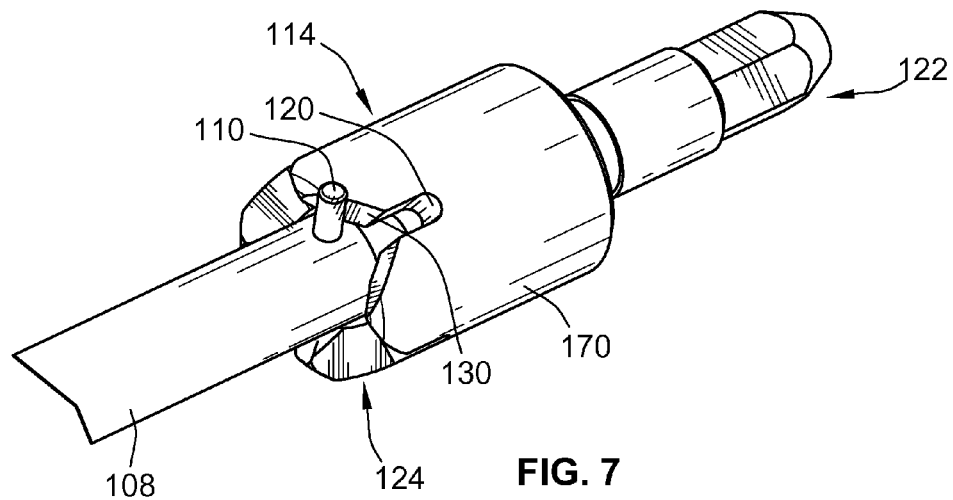
FIG. 7 is an isometric view of the drive pin of the drive shaft in partial engagement with a slot of the coupling member.
Figure 8:
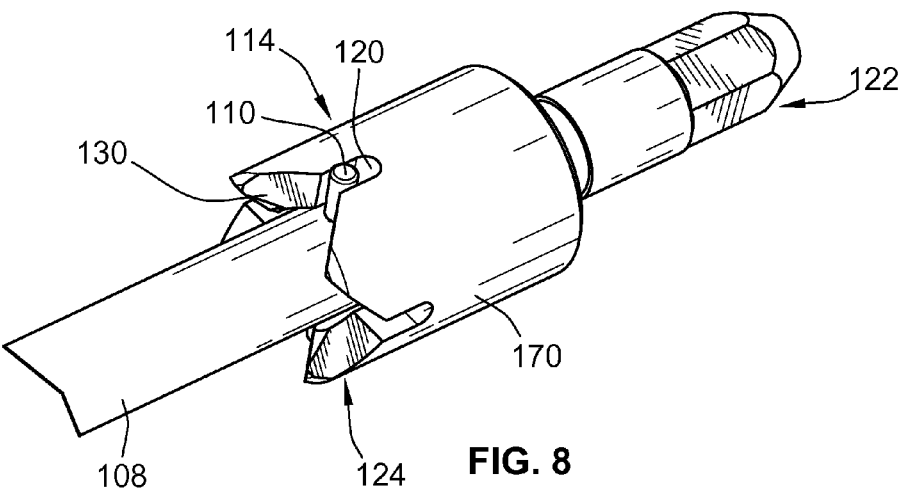
FIG. 8 is an isometric view of the drive pin of the drive shaft engaging a slot of the coupling member.

The drive pin engaging member 120 is a slot formed in the drive pin receiving end 124 (FIGS. 6-8). When the drive pin 110 is inserted into the slot 120 and received in the recess 126, the drive pin 110 is orthogonal to the axis 126 (FIG. 1). The racking drive shaft 108 is rotatable about the axis 126 by the coupling member 114 when the drive pin engaging member 120 (which, in this example, is a slot) engages the drive pin 110. The end 112 of the racking drive shaft 108 is tapered (FIGS. 1 and 6) so that it can be received in the recess 126 of the coupling member 114 when the door 104 is closed.

Figure 2:
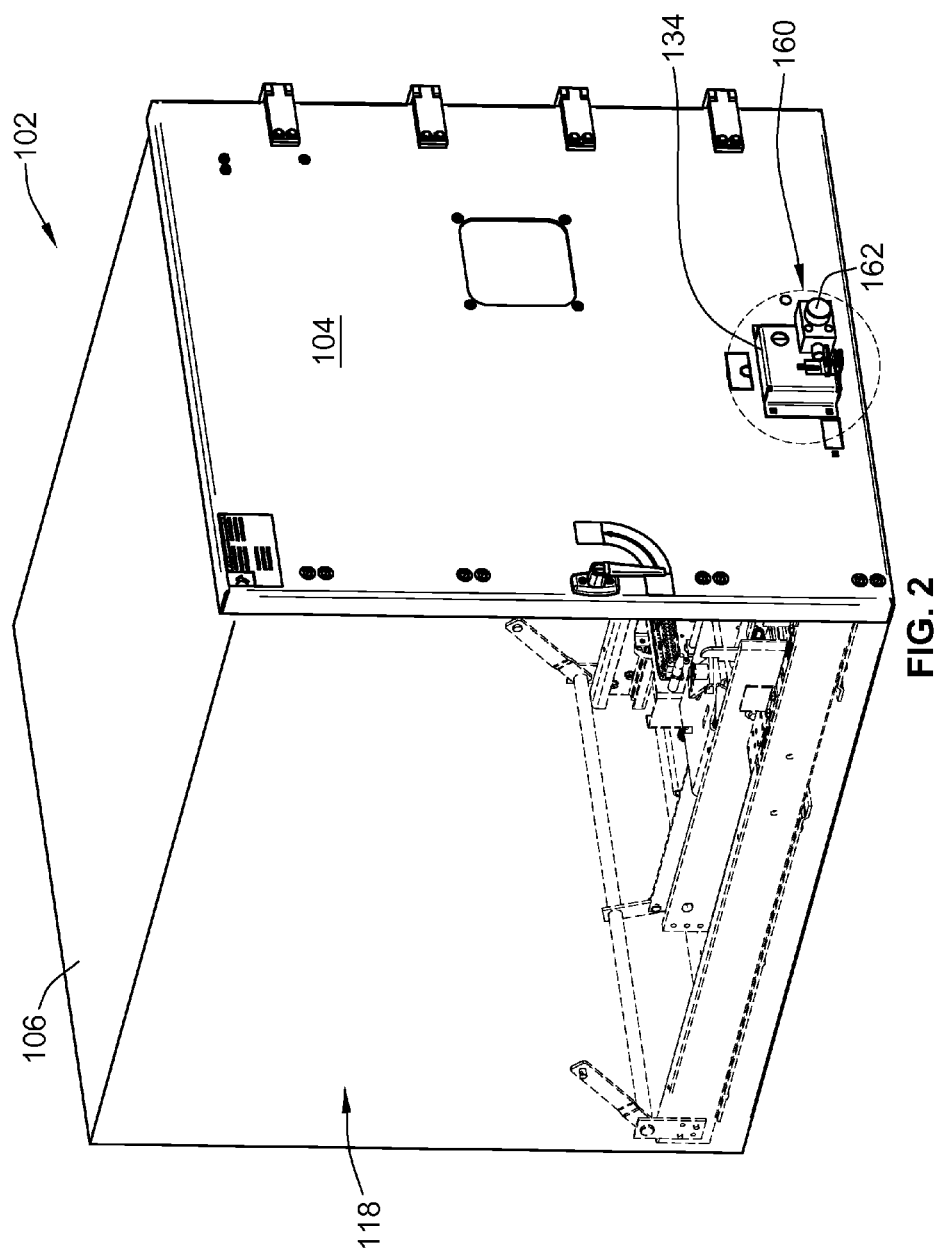
FIG. 2 is an isometric view of a switchgear having a compartment sealed by a door and a housing with padlock hasps and a deadbolt assembly for preventing access to a coupling member coupled to a drive shaft inside the compartment.
Figure 3:
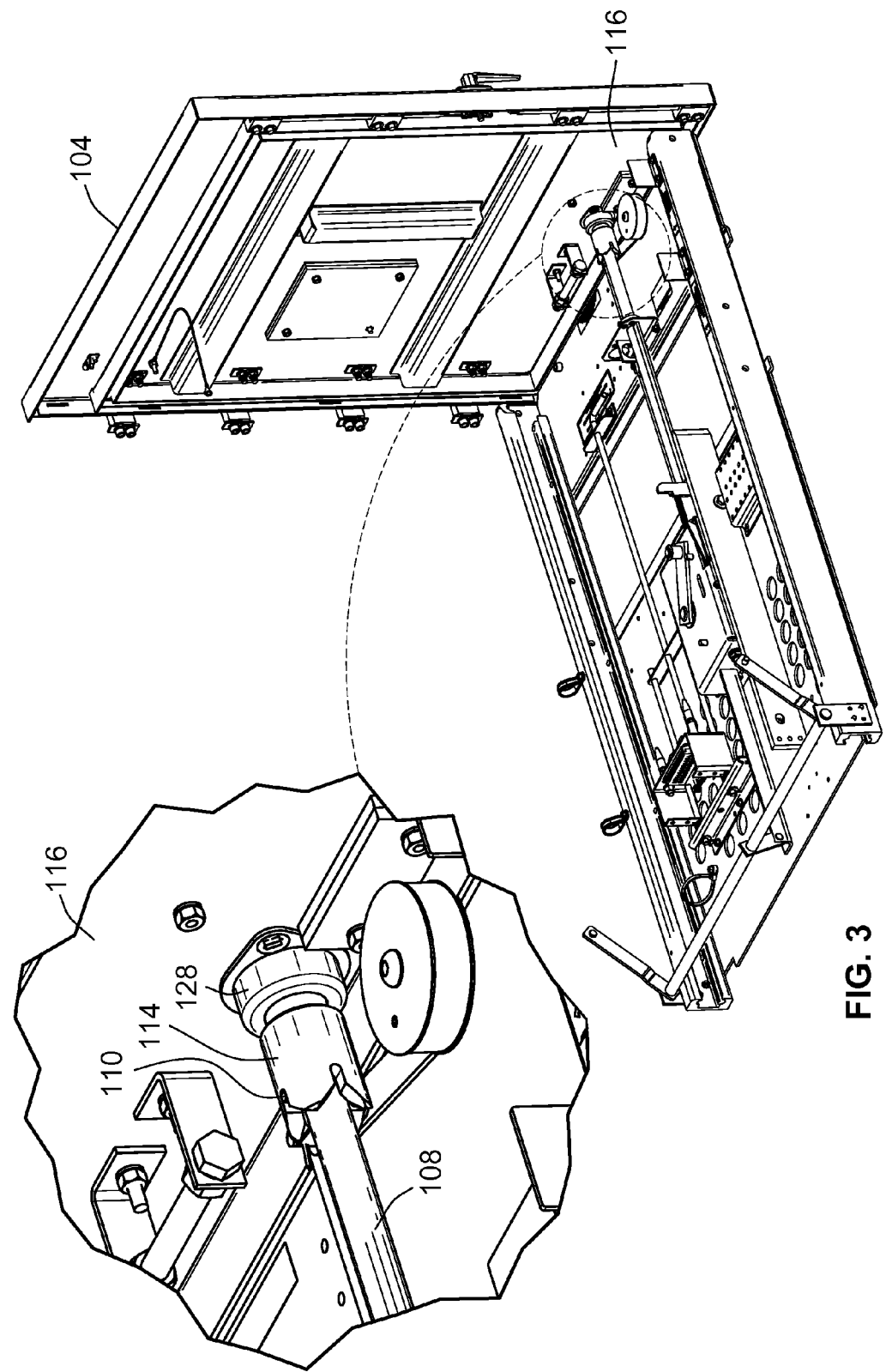
FIG. 3 is an isometric view of the switchgear shown in FIG. 2 with the compartment removed to show the inside of the door to the compartment and the interaction between the drive shaft and the coupling member that protrudes through the door.
Figure 4:
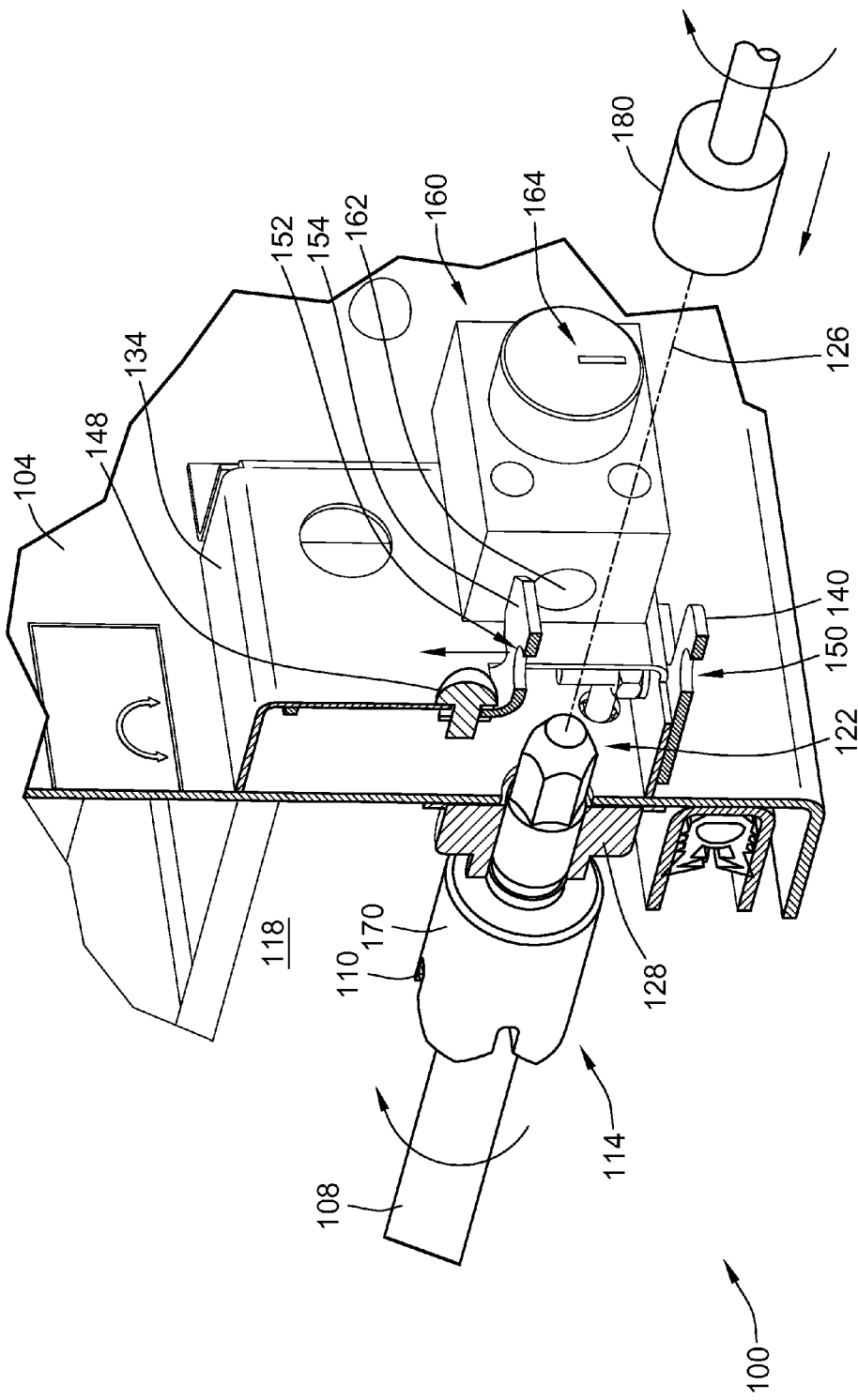
FIG. 4 is a cut-away isometric view of the assembly shown in FIG. 1 with the movable hasp shown in a position to expose the coupling member for engagement by a racking tool.
Figure 5:
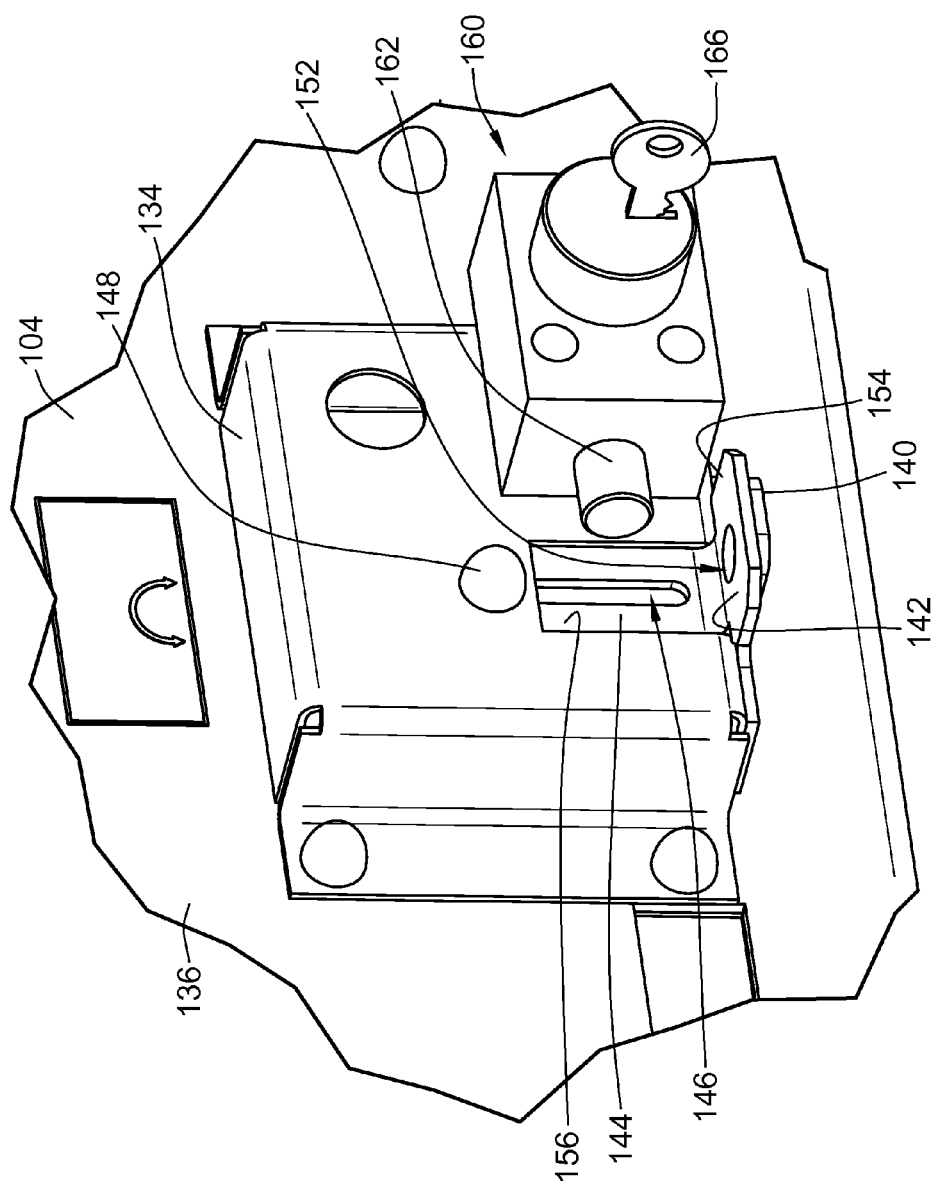
FIG. 5 is an isometric view of the housing shown in FIG. 1 with the deadbolt partially extended to block access to the coupling member and to prevent the movable hasp from being slid to expose the coupling member.

The assembly further includes a bushing 128 (FIGS. 1, 3, and 4) secured to the door 104. The coupling member 114 passes through an aperture of the bushing 128 to protrude through the door 104 (FIGS. 1 and 4). The bushing 128 can be riveted, screwed, or welded to the door 104 such that when the coupling member 114 is passed through the bushing 128, no exposed holes or openings are present between an exterior and an interior of the compartment 102 when the door 104 is closed (FIG. 2). The hermetic seal presented by the closed door 104 prevents arcing gasses or debris to be expelled out of the compartment 102 during an arcing explosion. The bushing 128 is hermetically coupled to the door 104 in a manner that leaves no exposed holes or openings between the bushing 128 and the door 104 (when the coupling member 114 is inserted into the bushing 128) (FIG. 3).

In the illustrated example, the racking tool receiving end or member 122 has a hexagonal cross-section (FIGS. 6-8) for insertion into a corresponding hexagonal-shaped socket end of a conventional racking tool 180 (FIG. 4). In other implementations, the racking tool receiving end 122 (and the corresponding racking tool) can have different cross-sections, such as square, octagonal, or the like. The racking tool 180 does not directly engage the racking drive shaft 108, but directly engages the racking tool receiving end 122, which lies outside of the compartment 106 and the door 104 of the switchgear 102. Thus, it is not possible for an operator to use the racking tool 180 to crank the drive shaft 108 while the door 104 is open. The racking tool 180 will not engage the end 112 of the drive shaft 108 to turn the drive shaft 108.

The recess 126 of the coupling member 114 has tapered lead-in sections 130 (FIGS. 6-8) to urge the drive pin 110 into the slot 120 when the coupling member 114 is moved into engagement with the end 112 of the racking drive shaft 108. The tapered lead-in sections 130 surround the slot 120, and urge the drive pin 110 into alignment with the slot 120 so that the drive pin 110 slides into and engages the slot 120 when the door 104 is closed, as can be seen from FIGS. 7 and 8.

The coupling member 114 can optionally include a second slot 132 (FIG. 8) orthogonal to the slot 120 and formed in the drive pin receiving end 124. In the illustrated example, there are four slots positioned 90 degrees apart from one another, and in between the slots is a corresponding tapered lead-in section 130 that urges the drive pin 110 into any of the four slots, including the slots 120, 132 when the coupling member 114 is moved into engagement with the end 112 of the racking drive shaft 108. Even if the drive pain 110 is slightly misaligned relative to a slot 120, 132, it will be guided by one of the tapered lead-in sections 130 into one of the slots 120, 132 as the door 104 is closed (FIGS. 7 and 8).

When the door 104 is opened, the coupling member 114 is separated from the racking drive shaft 108 (FIGS. 1 and 6) such that rotation of the coupling member 114 does not cause the racking drive shaft 108 to rotate. The operator cannot engage the smooth, rounded tapered end 112 of the drive pin 110 with a racking tool 180, which requires a custom-shaped profile (such as hexagonal) to engage the racking drive shaft 108. No modification to the circuit breakers inside the switchgear is required to be made to accommodate the assembly 100 disclosed herein.

To further prevent access to the protruding racking tool receiving end 122 of the coupling member 114 through the door 104, the assembly 100 can further include a housing 134 fixed to an exterior surface 136 of the door 104 (FIGS. 1, 2, 4, and 5). The housing 134 includes a slot 138 (FIG. 5) positioned over the protruding racking tool receiving end 122. The racking tool receiving end 122 does not protrude through the housing 134 (FIGS. 4-5), so the housing has a depth that is greater than a distance that the racking tool receiving end 122 protrudes through the door 104. The slot 138 has a width no smaller than a width of the racking tool receiving end 122 to receive the receiving end 122 through.

At least two ways of preventing or inhibiting access to the racking tool receiving end 122 will be described next. In a first implementation, a padlock (not shown) is used to prevent access to the racking tool receiving end 122. A fixed hasp 140 is secured to the housing 134 or to the exterior surface 136 of the door 104 (FIGS. 1 and 4). A movable hasp 142 includes a racking tool barrier member 144 positioned to cover the racking tool receiving end to prevent insertion of the racking tool 180 into the racking tool receiving end. The movable hasp 142 includes a slot 146 that receives a pin 148. The movable hasp 142 is slidable relative to the housing 134 to expose the racking tool receiving end 122 (FIG. 4). The operator pulls the movable hasp 142 in an upward direction (FIG. 4) causing the slot 146 to glide along the pin 148 until the racking tool receiving end 122 is exposed through the slot 138 in the housing 134. The operator can then insert a racking tool 180 into the racking tool receiving end 122 to rack the circuit breaker into or out of the switchgear (FIG. 4).

The fixed hasp 140 and the movable hasp 142 include corresponding padlock receiving co-aligned apertures 150, 152 (FIGS. 1 and 4) that receive a padlock (not shown) that locks the two hasps 140, 142 together preventing access to the racking tool receiving end 122. The padlock receiving aperture 152 is formed on a first surface 154 of the movable hasp 142. A second surface 156 is orthogonal to the first surface 154 and includes the slot 146.

In a second implementation, a deadbolt locking mechanism 160 is secured to the housing 134 and includes a bolt 162 that extends across the slot 138 of the housing 134 to prevent insertion of a racking tool 180 into the racking tool receiving end 122. The deadbolt locking mechanism 160 includes a keyhole 164 for receiving a key 166 (FIG. 5) that engages or disengages the bolt 162 by turning the key 166.

The housing 134 can be made of sheet metal and assists in maintaining the arc resistant (AR) ratings as specified in an applicable code or standard, such as specified by ANSI (American National Standards Institute) or the IEEE (Institute of Electrical and Electronics Engineers). When the door is closed relative to the compartment 106, there are no exposed holes or openings in the door 134 through which arc gasses or materials can be expelled from the equipment inside the compartment 106 during an arcing event. The compartment 106 thus remains sealed during a racking operation, providing additional protection to the operator against injury caused by an arcing event.

In the illustrated examples, the assembly 100 is used in medium voltage switchgear. The switchgear 100 can have a high, medium, or low voltage rating as defined by the American National Standards Institute (ANSI) or can refer to a switchboard as defined in Underwriters Laboratory Standard UL891. Examples of switchgear in which the assembly disclosed herein can be incorporated include the MASTERCLAD™ arc-resistant switchgear, the QED-6 rear-connected low-voltage switchgear, or POWERZONE-4® low-voltage, drawout switchgear, all available from Schneider Electric under its SQUARE D brand.

Although the drive pin 110 is shown and described above as being inserted into the end of the racking drive shaft 108 for engagement with a drive pin engaging member 120 of the coupling member 114, the location of the drive pin 110 and the recess 126 can be reversed in another configuration. In this alternate configuration, a head portion 170 of the coupling member 114 is removed from the coupling member 114 and instead fixed to the end of the racking drive shaft 108, and the drive pin 110 is inserted into the end of the coupling member 114. This configuration discourages the operator from manually turning the racking drive shaft 108 because the lack of a drive pin makes it more difficult for the operator to hand-turn or use a tool 180 to manually crank the racking drive shaft 108. The drive pin can easily be replaced by any other suitable mechanical interlockable apparatus for engagement by the drive pin engaging member. For example, the drive pin can be a shaped female slot that is configured to be received by a corresponding male member such that the engagement of the female slot and male member permits the coupling member to turn the drive shaft.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. An assembly for preventing a racking operation if a door of a compartment of a switchgear that houses a circuit breaker is not completely closed, comprising:
   a racking drive shaft positioned completely within an interior of a compartment that houses a circuit breaker, the racking drive shaft operable in response to being rotated to rack the circuit breaker into or out of the compartment;
   a drive pin inserted into an end of the racking drive shaft proximate a door of the compartment; and
   a coupling member coupled to an interior surface of the door facing the interior of the compartment, the coupling member including a drive pin engaging member that engages the drive pin in response to the door being closed to permit rotation of the racking drive shaft by a racking tool.

2. The assembly of claim 1, the coupling member including a racking tool receiving end and a drive pin receiving end, the coupling member further including a recess in the drive pin receiving end, the coupling member rotating about an axis extending along a length thereof.

3. The assembly of claim 2, wherein the drive pin engaging member is a slot formed in the drive pin receiving end, the drive pin being orthogonal to the axis when inserted into the slot and received in the recess, the racking drive shaft being rotatable about the axis by the coupling member in response to the drive pin engaging member being engaged with the drive pin.

4. The assembly of claim 2, wherein the racking tool receiving end protrudes through the door, the assembly further including a bushing secured to the door, the coupling member passing through an aperture of the bushing, whereby the door surface remains sealed.

5. The assembly of claim 2, wherein the end of the racking drive shaft is tapered to be received in the recess in response to the door being closed.

6. The assembly of claim 2, wherein the racking tool receiving end has a hexagonal cross-section for insertion into a corresponding hexagonal-shaped socket end of the racking tool.

7. The assembly of claim 3, wherein the recess has tapered lead-in sections to urge the drive pin into the slot in response to the coupling member being moved into engagement with the end of the racking drive shaft.

8. The assembly of claim 7, further comprising a second slot orthogonal to the slot and formed in the drive pin receiving end, the tapered lead-in sections urging the drive pin into the slot or the second slot in response to the coupling member being moved into engagement with the end of the racking drive shaft.

9. The assembly of claim 1, wherein in response to the door being open, the coupling member is separated from the racking drive shaft such that rotation of the coupling member does not cause the racking drive shaft to rotate.

10. The assembly of claim 1, wherein the racking tool receiving end protrudes through the door, the assembly further comprising a housing fixed to an exterior surface of the door, the housing including a slot positioned over the coupling member, the housing having a depth that is greater than a distance that the racking tool receiving end protrudes through the door, the slot in the housing having a width no smaller than a width of the racking tool receiving end.

11. The assembly of claim 10, further comprising a fixed hasp secured to the housing or to the exterior surface of the door and a movable hasp having a racking tool barrier member positioned to cover the racking tool receiving end to prevent insertion of the racking tool into the racking tool receiving end, the movable hasp being slidable relative to the housing to expose the racking tool receiving end.

12. The assembly of claim 11, wherein the fixed hasp and the movable hasp each has corresponding padlock receiving apertures for receiving therein a padlock.

13. The assembly of claim 12, wherein the movable hasp has a first surface that includes the padlock receiving aperture and a second surface orthogonal to the first surface, the second surface including a slot for slidably engaging a pin secured to the housing as the movable hasp is moved to expose or cover the racking tool receiving end.

14. The assembly of claim 10, further comprising a deadbolt locking mechanism having a bolt that extends across the slot to prevent insertion of the racking tool into the racking tool receiving end.

15. The assembly of claim 14, wherein the deadbolt locking mechanism includes a keyhole for receiving a key that engages or disengages the bolt by turning the key.

16. An assembly for preventing a racking operation while a door of a compartment of a switchgear that houses a circuit breaker is open, comprising:
  a racking drive shaft positioned completely within an interior of a compartment that houses a circuit breaker, the racking drive shaft operable to rack the circuit breaker into or out of the compartment in response to the drive shaft being rotated;
  a drive pin; and
  a drive pin engaging member located inside the compartment when the door is closed;
  a racking tool receiving member that protrudes through the door, wherein
  the drive pin engaging member engages the drive pin in response to the door being closed to permit rotation of the racking drive shaft by a racking tool inserted into the racking tool receiving member.

17. The assembly of claim 16, wherein the drive pin engaging member and the racking tool receiving member comprise a coupling member, the drive pin being inserted into an end of the racking drive shaft proximate a door of the compartment.

18. The assembly of claim 17, the coupling member including a racking tool receiving end and a drive pin receiving end, the coupling member further including a recess in the drive pin receiving end, the coupling member rotating about an axis extending along a length thereof.

19. The assembly of claim 18, wherein the drive pin engaging member is a slot formed in the drive pin receiving end, the drive pin being orthogonal to the axis when inserted into the slot and received in the recess, the racking drive shaft being rotatable about the axis by the coupling member in response to the drive pin engaging member being engaged with the drive pin.

20. The assembly of claim 18, wherein the racking tool receiving end protrudes through the door, the assembly further including a bushing secured to the door, the coupling member passing through an aperture of the bushing, whereby the door remains sealed.

21. The assembly of claim 16, wherein the drive pin engaging member is part of the drive shaft, and the drive pin is coupled to the racking tool receiving member to rotate with the racking tool receiving member.

* * * * *